United States Patent
Tonon et al.

(10) Patent No.: US 10,036,327 B2
(45) Date of Patent: Jul. 31, 2018

(54) DAMPER WITH BENT NECK FOR GAS TURBINE

(71) Applicant: Ansaldo Energia Switzerland AG, Baden (CH)

(72) Inventors: Devis Tonon, Turgi (CH); Mirko Ruben Bothien, Zürich (CH); Franklin Marie Genin, Baden (CH); Douglas Anthony Pennell, Windisch (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 824 days.

(21) Appl. No.: 14/523,040

(22) Filed: Oct. 24, 2014

(65) Prior Publication Data
US 2015/0113992 A1 Apr. 30, 2015

(30) Foreign Application Priority Data
Oct. 28, 2013 (EP) .................... 13190439

(51) Int. Cl.
*F02C 7/24* (2006.01)
*F23R 3/00* (2006.01)
*F23M 20/00* (2014.01)

(52) U.S. Cl.
CPC ............ *F02C 7/24* (2013.01); *F23M 20/005* (2015.01); *F23R 3/002* (2013.01); *F05D 2260/963* (2013.01); *F23R 2900/00014* (2013.01)

(58) Field of Classification Search
CPC ... F02C 7/24; F23M 20/005; F05D 2260/963; F23R 3/002; F23R 2900/00014
See application file for complete search history.

(56) References Cited

U.S. PATENT DOCUMENTS

| | | | | |
|---|---|---|---|---|
| 5,353,598 A | * | 10/1994 | Huck | ............... F02K 1/827 181/213 |
| 6,122,892 A | | 9/2000 | Gonidec et al. | |

(Continued)

FOREIGN PATENT DOCUMENTS

| CN | 103075744 A | 5/2013 |
|---|---|---|
| EP | 0 576 717 A1 | 1/1994 |

(Continued)

OTHER PUBLICATIONS

First Office Action dated Dec. 5, 2017 in corresponding Chinese Application No. 201410587744.8, and an English translation thereof.

*Primary Examiner* — Carlos A Rivera
(74) *Attorney, Agent, or Firm* — Buchanan Ingersoll & Rooney PC

(57) ABSTRACT

The invention relates to a damper for reducing the pulsations in a chamber of a gas turbine. The damper includes a resonator cavity and a neck in flow communication with the resonator cavity and the chamber. The neck includes a mouth to communicate with the chamber. The air flow inside the chamber flows across the mouth of the neck. The neck is so configured that the longitudinal axis of its mouth is angled 0-90° relative to the direction of the air flow inside the chamber. The damper of this invention may effectively alleviate the detrimental effect of the grazing flow and thus it enables the placement of the damper also at locations where strong grazing flows are present.

3 Claims, 4 Drawing Sheets

(56) References Cited

U.S. PATENT DOCUMENTS

| | | | | |
|---|---|---|---|---|
| 7,413,053 B2* | 8/2008 | Wasif | ............... | F23M 20/005 |
| | | | | 181/210 |
| 8,336,312 B2 | 12/2012 | Rajaram et al. | | |
| 2004/0211185 A1* | 10/2004 | Young | ............... | F23R 3/002 |
| | | | | 60/725 |
| 2006/0231329 A1* | 10/2006 | Borja | ............... | B64D 33/02 |
| | | | | 181/250 |
| 2008/0087019 A1* | 4/2008 | Macquisten | ............ | F23R 3/002 |
| | | | | 60/725 |
| 2010/0284789 A1* | 11/2010 | Brooks | ............... | F01D 5/26 |
| | | | | 415/119 |
| 2010/0319349 A1 | 12/2010 | Rajaram et al. | | |
| 2012/0102963 A1* | 5/2012 | Corr | ............... | F23R 3/002 |
| | | | | 60/772 |
| 2012/0228050 A1 | 9/2012 | Bulat | | |
| 2012/0288807 A1* | 11/2012 | Kim | ............... | F23R 3/002 |
| | | | | 431/114 |
| 2013/0074471 A1 | 3/2013 | Khan et al. | | |
| 2014/0109591 A1* | 4/2014 | Bothien | ............... | F02C 6/02 |
| | | | | 60/791 |
| 2014/0345282 A1* | 11/2014 | Pfadler | ............... | F23R 3/002 |
| | | | | 60/725 |
| 2014/0345284 A1* | 11/2014 | Bothien | ............... | F23M 20/005 |
| | | | | 60/725 |
| 2016/0215984 A1* | 7/2016 | Bothien | ............... | F23R 3/06 |

FOREIGN PATENT DOCUMENTS

| | | |
|---|---|---|
| EP | 2 302 302 A1 | 3/2011 |
| EP | 2 573 467 A2 | 3/2013 |
| WO | 2013/029984 A2 | 3/2013 |

\* cited by examiner

DAMPER WITH BENT NECK FOR GAS TURBINE

CROSS-REFERENCE TO RELATED APPLICATIONS

This application claims priority to European application 13190439.3 filed Oct. 28, 2013, the contents of which are hereby incorporated in its entirety.

TECHNICAL FIELD

The present invention relates to a gas turbine, in particular to a damper for reducing the combustion dynamics in a chamber of a gas turbine.

The combustion dynamics here includes but not limit to pulsations, acoustic oscillations, pressure and velocity fluctuations and noise. The chamber of a gas turbine here includes not only combustion chamber, but also air channels, plenums and the like where combustion dynamic exist.

BACKGROUND

In conventional gas turbines, acoustic oscillation usually occurs in the chambers of the gas turbines. The term chamber means any gas volume where combustion dynamics exist. In these chambers a gas (for example a mixture of fuel and air or exhaust gas) flows with high velocity which causes noises. Burning air and fuel in the combustion chamber causes further noises. This acoustic oscillation may evolve into highly pronounced resonance. Such oscillation, which is also known as combustion chamber pulsations, can assume amplitudes and associated pressure fluctuations that subject the combustion chamber itself to severe mechanical loads that may decisively reduce the life of the combustion chamber and, in the worst case, may even lead to destruction of the combustion chamber.

To reduce the acoustic oscillations noise it is well known in the art to install acoustic damping devices like a Helmholtz resonator, a half-wave tube, a quarter-wave tube or other types of damping devices.

As an example, FIG. 1 schematically shows the arrangement of a conventional Helmholtz resonator. As shown in the figure, the Helmholtz resonator 10 comprises a resonator cavity 11 connected to the chamber 14 via a neck 12. The neck 12 includes a mouth 13 at its outlet end. The chamber 14 is only partially shown in FIG. 1 with the inner surface 15 of the chamber.

The principle of the Helmholtz resonator is given herein. The resonator cavity 11 acts as a spring for air expansion and contraction in the cavity. The air in the neck 12 behaves as a mass connected to the spring. This system has one or more resonance frequencies. When acoustic waves are at a frequency close to one of the resonance frequencies of the damper and impinge the mouth of the neck, the damper reduces or damps such pulsations. The mass of air oscillates due to the spring effect of the cavity. The oscillation of the air through the neck triggers vortex shedding at the neck. In this way, acoustic energy is converted into aerodynamic energy which ultimately dissipates into heat. Enhanced dissipation is often introduced by means of a flow of gas through the damper neck. This is referred to through flow or bias flow.

However, the gas flow inside the chamber flowing across the mouth 13 of the neck 12 (referred to as grazing flow in the following description) will affect the damping performance. In particular, the inventors of this invention have found that, a high velocity of the grazing flow compared to the air flow through the damper neck (referred to as bias flow in the following description), has a detrimental effect on the damper performance. To avoid the decreased performance of the damper, current solution is to arrange the damper in the regions of the chamber where the velocity of the grazing flow is not so high compared to the bias flow velocity. However, under some situations, the preferred damper location is in regions subjected to high grazing flow velocity.

SUMMARY

It is therefore an object of the present invention to provide a damper for a gas turbine that may effectively alleviate the detrimental effect of the grazing flow and thus it enables the placement of the damper also at locations where strong grazing flows are present.

This object is achieved by a damper for reducing the pulsations in a chamber of a gas turbine, wherein the damper comprises a resonator cavity and a neck in flow communication with the resonator cavity and the chamber, wherein the neck includes a mouth to communicate with the chamber, wherein air flow inside the chamber flows across the mouth of the neck. The neck is so configured that the longitudinal axis of its mouth is angled 0°-90° relative to the direction of the air flow inside the chamber. The geometry of such neck will induce a flow distribution at the mouth that reduces or eliminate the detrimental effect of the grazing flow on the damping performances.

According to one possible embodiment, the neck protrudes into the chamber and is bent along the direction of the air flow inside the chamber, wherein the longitudinal axis of the mouth of the neck is formed in 0°-90° relative to the direction of the air flow inside the chamber.

According to another one possible embodiment, the neck protrudes into the chamber and is bent with the longitudinal axis of its mouth in alignment with the direction of the air flow inside the chamber. That is, the neck is bent along the direction of the air flow so that the longitudinal axis of the mouth is configured to 0° relative to the direction of said flow.

According to another one possible embodiment, the neck protrudes into the chamber and is bent with the longitudinal axis of its mouth in 90° relative to the direction of the air flow inside the chamber.

According to another one possible embodiment, the neck is formed as a slanted channel with the longitudinal axis thereof in acute angle relative to the direction of the grazing flow inside the chamber. This slanted neck will modify the fluid dynamic interaction of the bias flow leaving the mouth with the grazing flow. This modifies the tendency of the grazing flow to restrict the passage of the bias flow that leaves the neck of the damper. This has the effect of modifying the effect of the grazing flow on the acoustic properties of the damper.

According to another one possible embodiment, the mouth of the neck is covered on one side by a shield that deflects the flow through the neck in a direction parallel to the direction of the flow inside the chamber.

The damper of present invention may include a Helmholtz resonator with one or more damping volumes, a half-wave tube, a quarter-wave tube, a multi-volume damper, a liner or any kind of acoustic flow through damper.

With the damper according to the present invention, the damping performance is not affected by the strong grazing flows inside the combustion chamber.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

DETAILED DESCRIPTION

Figure 1:
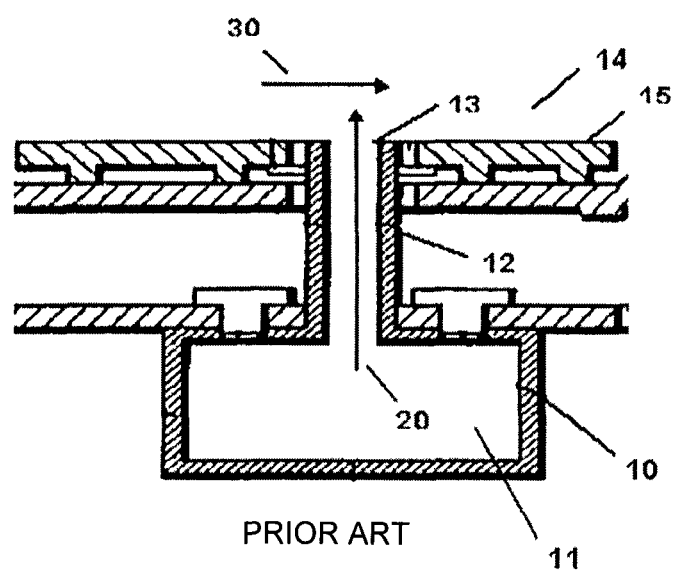
FIG. 1 shows a schematic view of the damper and combustion chamber in prior art.

FIG. 1 shows the arrangement of a conventional damper 10 used in a gas turbine, which is already described in the above. The grazing flow 30, i.e., the gas flow inside the chamber 14, flows across the mouth 13 of the neck 12. In the meantime, the bias flow 20, i.e., the gas flow through the neck 12, goes into the chamber 14 perpendicular to the grazing flow 30. As mentioned above, the inventors have found through tests that the increase of the ratio between grazing flow compared to the bias flow tends to restrict the passage of the bias flow that leaves the neck of the damper. Thus the damping performance of the damper will be significantly reduced.

Figure 2:
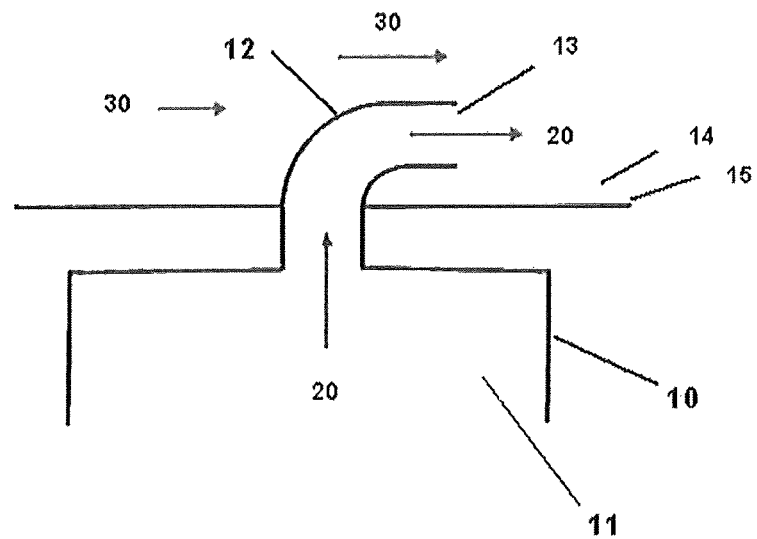
FIG. 2 shows a schematic view of the first embodiment of the invention.

FIG. 2 shows a first embodiment of the present invention. As schematically showed in FIG. 2, a damper 10 is arranged for reducing the pulsations in a chamber 14 of a gas turbine. The damper 10 comprises a resonator cavity 11 and a neck 12. The neck 12 is in flow communication with the resonator cavity 11 and the interior of the chamber 14. The neck 12 includes a mouth 13 to communicate with the chamber 14. The gas flow inside the chamber 14, i.e., the grazing flow 30, flows across the mouth 13 of the neck 12, and the gas flow, i.e., the bias flow 20, may go through the neck 12. The neck 12 protrudes into the chamber 14. In the meantime, it is bent along the flow direction of the grazing flow 30. In the first embodiment of the invention, the neck 12 is so bent that the longitudinal axis of its mouth 13 is in alignment with the direction of the grazing flow 30. That is, the neck 12 is bent along the flow direction of the grazing flow 30 so that the longitudinal axis of the mouth 13 is configured to 0° relative to the direction of the grazing flow 30. Although in this first embodiment, the longitudinal axis of the mouth 13 is configured to 0° relative to the direction of the grazing flow 30, it is readily known to those skilled in the art that the alternatives with a small angle relative to the direction of the grazing flow 30 are equivalent to the first embodiment.

Figure 3:
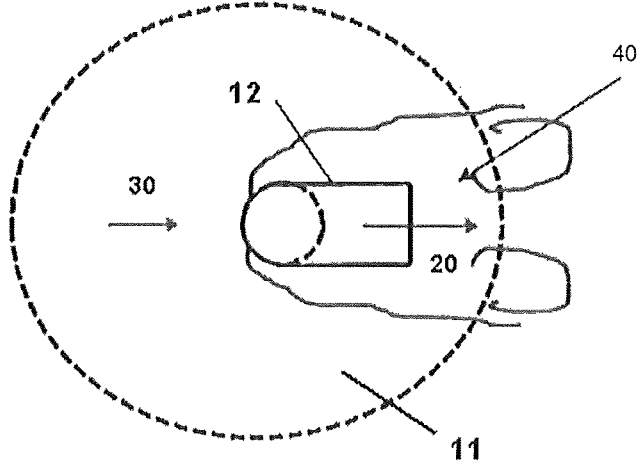
FIG. 3 shows a schematic plan view of the first embodiment of the invention.

FIG. 3 shows a planned view of the damper 10 in FIG. 2. The curves above and below the neck 12 in FIG. 3 schematically show the air flow region of the grazing flow 30. As the neck 12 protrudes into the grazing flow region of the chamber 14 and is bent along the direction of the grazing flow 30, in case of sufficiently high velocities of the grazing flow, the neck 12 leads to a separation of the grazing flow 30 and the consequent formation of a low grazing flow velocity region as shown by the curves in FIG. 3. Thus, the detrimental interference of the grazing flow 30 to the bias flow 20 out of the neck 12 is further alleviated and the damping performance is improved.

According to the first embodiment, the detrimental effect of the grazing flow on the bias flow can be first reduced by the alignment of the bias flow with the grazing flow through the configuration of the mouth 13 of the neck 12 in the damper 10. Further, as the neck 12 will deflect the grazing flow and create a region of low grazing flow velocity around the mouth 13, it gives an additional help to reduce the detrimental effect of the grazing flow on the acoustic properties.

Figure 4:
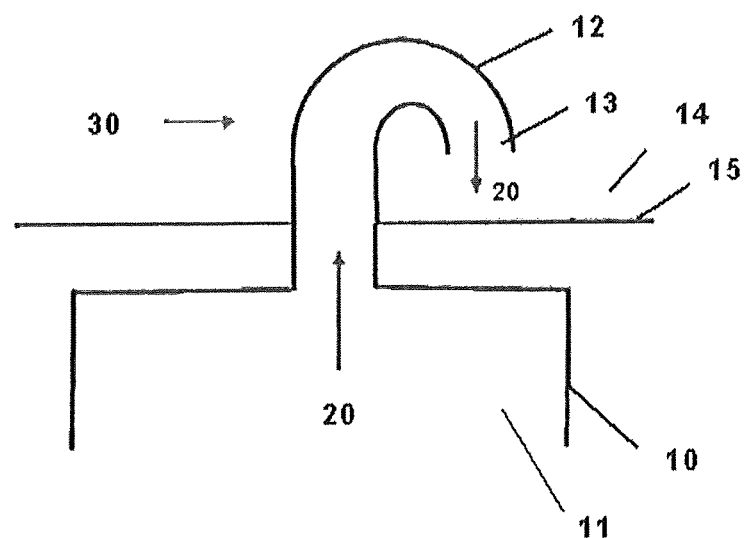
FIG. 4 shows a schematic view of the second embodiment of the invention.

FIG. 4 shows a second embodiment of the present invention. The basic structure of the damper 10 in the second embodiment is similar to that in the first embodiment. The neck 12 also protrudes into the chamber 14. The difference from the first embodiment is that the neck 12 is bent with the longitudinal axis of its mouth in 90° relative to the direction of the grazing flow 30. More particular, as shown in FIG. 4, the neck 12 is bent in clockwise direction and formed to 90° relative to the grazing flow direction. Although in this second embodiment, the longitudinal axis of the mouth 13 is configured to 90° relative to the direction of the grazing flow 30, it is readily known to those skilled in the art that the alternatives with the angle a little bit more or less than 90° relative to the direction of the grazing flow 30 are equivalent to the second embodiment and thus also covered by the present invention.

Figure 5:
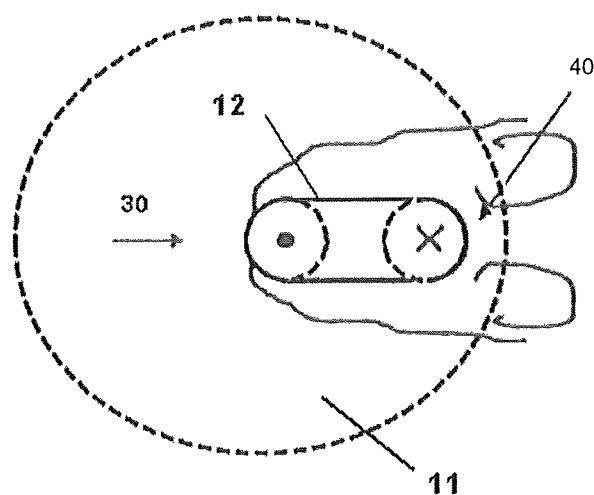
FIG. 5 shows a schematic plan view of the second embodiment of the invention.

FIG. 5 shows a planned view of the damper 10 in FIG. 4. Similar to the first embodiment, the neck 12 protrudes into the grazing flow region of the chamber 14 and is bent so that, in case of sufficiently high velocities of the grazing flow, the neck 12 leads to a separation of the grazing flow and the consequent formation of a low grazing flow velocity region, as shown by the curves in FIG. 5. This helps to reduce the detrimental effect of the grazing flow on the acoustic properties.

The first and second embodiments above respectively limit a damper 10 with the neck 12 protruded into the chamber 14 and bent with the longitudinal axis of its mouth 13 in 0° and 90° relative to the direction of the grazing flow 30. It is readily known by those skilled in the art that a neck protruded into the combustion chamber and bent along the grazing flow direction with the longitudinal axis of the mouth 13 between 0° and 90° relative to the grazing flow direction could also achieve the objective of the present invention and thus be covered by the present invention.

Figure 6:
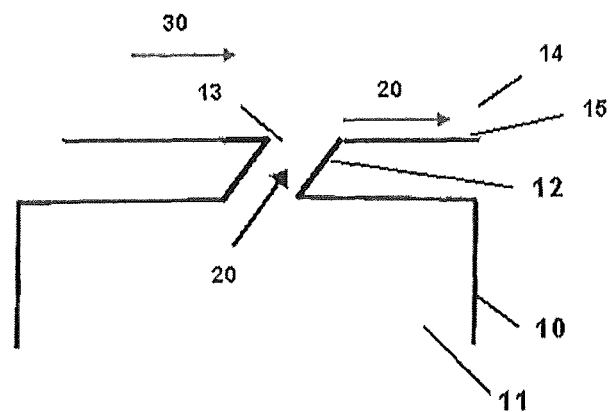
FIG. 6 shows a schematic view of the third embodiment of the invention.

FIG. 6 shows a third embodiment of the present invention. In this embodiment, the neck 12 does not protrude into the chamber 14 but it is formed as a slanted channel to communicate the resonator cavity 11 and the interior of the chamber 14. The neck 12 is so formed that the longitudinal axis thereof is in acute angle relative to the grazing flow direction. This slanted neck will modify the fluid dynamic interaction of the bias flow 20 leaving the mouth 13 with the grazing flow 30. This modifies the tendency of the grazing flow to restrict the passage of the bias flow that leaves the neck of the damper, and thus alleviate the effect of the grazing flow 30 on the acoustic properties of the damper 12 so the damping performance is improved.

Figure 7:
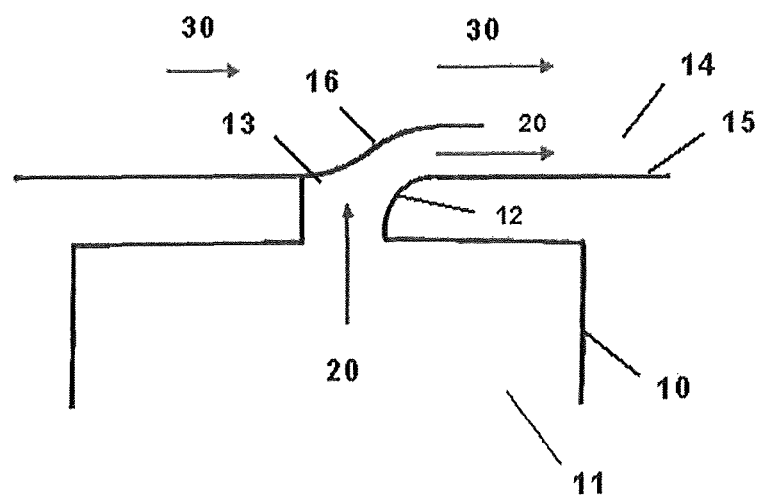
FIG. 7 shows a schematic view of the fourth embodiment of the invention.

FIG. 7 shows a fourth embodiment of the present invention. The basic configuration is similar, i.e., the neck 12 is in communication with the resonator cavity 11 and the chamber 14. The mouth 13 of the neck 12 will be covered on one side by a shield 16 that deflects the bias flow 20 in a direction parallel to the grazing flow 30 which flows across the neck 12. The volume between the inner surface 15 of the combustion chamber 14 and the shield 16 acts as a part of the neck 12. Thus, the detrimental interference of the grazing flow 30 to the bias flow 20 out of the neck 12 is alleviated and the damping performance is improved.

It is to be noted that the damper in the present invention includes Helmholtz resonators with one or more damping volumes, also includes a half-wave tube, a quarter-wave tube, a multi volume damper, a liner or any kind of acoustic flow through damper that is known from the art. The chamber mentioned in the present invention may be a combustor chamber, a mixing chamber, air channels, plenums and the like where combustion dynamic exists.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A damper for reducing the pulsations in a combustion chamber of a gas turbine where there is a combustion dynamic, the damper comprising:
    a resonator cavity; and
    a neck in flow communication with the resonator cavity and protruding into the combustion chamber, wherein the neck includes a mouth end inside the combustion chamber, wherein the damper is configured to produce air flow inside the combustion chamber across the mouth end of the neck, and wherein the neck inside the combustion chamber has a curved longitudinal axis such that the mouth end is angled from 0° to less than 90° relative to a direction of intended air flow inside the combustion chamber.

2. The damper according to claim 1, wherein the neck is bent along the direction of intended air flow inside the combustion chamber.

3. The damper according to claim 2, wherein the neck is bent with the longitudinal axis of the mouth end in alignment with the direction of intended air flow inside the combustion chamber.

* * * * *